United States Patent [19]
Budd et al.

[11] Patent Number: 5,217,933
[45] Date of Patent: Jun. 8, 1993

[54] YTTRIA-ALUMINA FIBERS

[75] Inventors: Kenton D. Budd, Woodbury; David M. Wilson, Roseville, both of Minn.

[73] Assignee: Minnesota Mining and Manufacturing Company, St. Paul, Minn.

[21] Appl. No.: 709,377

[22] Filed: Jun. 3, 1991

[51] Int. Cl.$^5$ .............................. C04B 35/500
[52] U.S. Cl. ............................. 501/95; 501/152; 501/153; 501/10
[58] Field of Search .............. 501/95, 152, 153, 10

[56] References Cited

U.S. PATENT DOCUMENTS

| | | | |
|---|---|---|---|
| 3,385,915 | 5/1968 | Hamling | 428/220 |
| 3,663,182 | 5/1972 | Hamling | 428/224 |
| 3,808,015 | 4/1974 | Seufert | 501/95 |
| 3,950,478 | 4/1976 | Kenworthy et al. | 264/234 |
| 3,992,498 | 11/1976 | Morton et al. | 264/63 |
| 3,994,740 | 11/1976 | Morton | 106/65 |
| 4,007,020 | 2/1977 | Church et al. | 51/295 |
| 4,040,890 | 8/1977 | Burrus, Jr. et al. | 156/605 |
| 4,166,831 | 9/1979 | Rhodes et al. | 501/153 X |
| 4,331,627 | 5/1982 | Yamamoto et al. | 264/332 |
| 4,349,456 | 9/1982 | Sowman | 252/317 |
| 4,724,109 | 2/1988 | Yamashita et al. | 264/63 |
| 4,770,671 | 9/1988 | Monroe et al. | 51/293 |
| 4,801,562 | 1/1989 | Sowman et al. | 501/35 |
| 4,841,195 | 6/1989 | DeWith et al. | 501/152 X |
| 4,861,737 | 8/1989 | Prud'Homme van Reine et al. | 501/152 |
| 4,921,819 | 5/1990 | Ramachandran | 501/127 |
| 4,929,578 | 5/1990 | Sowman | 501/95 |
| 4,964,883 | 10/1990 | Morris et al. | 51/293 |

FOREIGN PATENT DOCUMENTS

| | | |
|---|---|---|
| 0293163 | 11/1988 | European Pat. Off. |
| 309091 | 3/1989 | European Pat. Off. |
| 1671029 | 3/1972 | Fed. Rep. of Germany |
| 3028314 | 2/1981 | Fed. Rep. of Germany |

OTHER PUBLICATIONS

J. Less-Common Metals, 114, 1985, pp. 199-206, B. Cockayne.

Primary Examiner—Mark L. Bell
Assistant Examiner—C. M. Bonner
Attorney, Agent, or Firm—Gary L. Griswold; Walter N. Kirn; Gregory D. Allen

[57] ABSTRACT

This invention provides a continuous ceramic oxide fiber comprising Al, Y, and O. In another aspect, a method of making the same is taught. The continuous ceramic oxide fiber is useful, for example, as thermal insulation, as a filter component, and as a reinforcement for structural composites.

30 Claims, No Drawings

YTTRIA-ALUMINA FIBERS

FIELD OF THE INVENTION

This invention relates to a continuous ceramic oxide fiber comprising Al, Y, and O, and a method for making the same. The fiber is useful as thermal insulation, as a filter component, and as a reinforcement for structural composites.

BACKGROUND OF THE INVENTION

Yttria-alumina compounds are known in the art and tend to be highly refractory (e.g., have a melting point above 1900° C.) and extremely chemically inert.

Cockayne in "The Uses and Enigmas of the $Y_2O_3$-$Al_2O_3$ Phase System" *J. Less-Common Metals*, 114, 1985, pp. 199-206, reviewed selected properties and uses of the three crystalline yttria-alumina compounds (i.e., $Y_3Al_5O_{12}$, $YAlO_3$, and $Y_4Al_2O_9$) in the $Y_2O_3$-$Al_2O_3$ system.

Methods of making single crystal $Y_3Al_5O_{12}$ yttria aluminum garnet) fibers are known in the art. For example, U.S. Pat. No. 4,040,890 (Burru, Jr. et. al.), teaches a method of making a single crystal neodymium-doped yttria aluminum garnet fiber from a melt.

Processes for making amorphous or polycrystalline alumina or modified alumina fibers are also known. For example, U.S. Pat. Nos. 3,992,498 (Morton et. al.), 3,994,740 (Morton et. al.) 3,950,478 (Kensworth et. al.), 4,801,562 (Sowan et. al.), 4,929,578 (Sowman) teach alumina and alumina-based fibers derived from liquid chemical precursors. Although patentees suggest the modified alumina fibers may contain one or more metal oxides including yttria, it is not believed any of these references teach an alumina fiber having substantial amounts of yttria, it is not believed any disclose fiber compositions based on yttria-alumina compounds, nor is it believed any provide suitably compatible chemical precursors for incorporating substantial amounts of yttria into an alumina fiber.

U.S. Pat. No. 4,007,020 (Church et. al.) teaches a method of incorporating a metal oxide into an alumina body, wherein a precursor of the metal oxide is impregnated into a porous alumina body. The impregnated body is subsequently heated to form the metal oxide. Although patentees list yttria as one of many metal oxides which could be incorporated into an alumina body by their method, they provide no working examples of incorporating yttria into any alumina body, nor do they suggest a suitable, yttria precursor. Further, it is not clear from patentees' disclosure the maximum amount of metal oxide which can be incorporated into an alumina body by their method.

Ceramic abrasive grits containing alumina and yttria have been taught. For example, U.S. Pat. No. 4,770,67 (Monroe et. al.) teaches alumina-based ceramic abrasive grits comprising yttria in the range from 0.5 to 30.0 percent by weight. European Pat. Appl. No. 0293 163 (Wood) teaches alumina-based ceramic abrasive grits which may contain yttria in the range from 0.5 to 30.0 percent by weight. U.S. Pat. No. 4,964,883 (Morris et. al.) teaches a process for making iron seeded alumina-based ceramic abrasive grits which may contain yttria. Patentees, however, do not disclose or suggest an yttria-alumina fiber.

SUMMARY OF THE INVENTION

Briefly, the present invention provides a continuous ceramic oxide fiber comprising Al, Y, and O, wherein the fiber comprises at least one of amorphous regions and polycrystalline regions, wherein the fiber has a total $Y_2O_3$ content in the range from 28.5 to 90.7 percent by weight and a total $Al_2O_3$ content in the range from 71.5 to 9.3 percent by weight, and wherein the sum of the total $Y_2O_3$ content and the total $Al_2O_3$ content is at least 80.0 percent by weight, based on the total oxide content of the fiber.

The known crystalline yttria-alumina compounds within the $Y_2O_3$-$Al_2O_3$ system are $Y_3Al_5O_{12}$, $YAlO_3$, and $Y_4Al_2O_9$. The compositional range of the fiber according to the present invention corresponds to formulations having an yttria-alumina compound content of at least 50.0 percent by weight, based on the total oxide fiber composition. To illustrate this point, L composition having a total $Y_2O_3$ content of 28.5 percent by weight and a total $Al_2O_3$ content of 71.5 percent by weight corresponds to a formulation having a $Y_3Al_5O_{12}$ content of 50.0 percent by weight and an additional $Al_2O_3$ content of 50.0 percent by weight. As another example, a fiber composition having a total $Y_2O_3$ content of 90.7 percent by weight and a total $Al_2O_3$ content of 9.3 percent by weight corresponds to a formulation having a $Y_4Al_2O_9$ content of 50.0 percent by weight and additional $Y_2O_3$ content of 50.0 percent by weight.

Preferably, the inventive fiber has a total $Y_2O_3$ content in the range from 45.7 to 85.3 percent by weight and a total $Al_2O_3$ content in the range from 54.3 to 14.7 percent by weight. This corresponds to a composition having an yttria-alumina compound content of at least 80.0 percent by More preferably, the inventive fiber has a total $Y_2O_3$ content in the range from 57.1 to 81.6 by weight and a total $Al_2O_3$ content in the range from 42.9 to 18.4 percent by weight. In the absence of other oxide additives, this corresponds to an yttria-alumina compound content of 100 percent by weight.

It is believed that fibers used in applications requiring good thermo-chemical stability (e.g., fibers used as a reinforcement in metal matrix composites) preferably have a high yttria content. For example, a preferred embodiment according to the present invention has a total $Y_2O_3$ content in the range from greater than 50.0 to 90.7 percent by weight and a total $Al_2O_3$ content in the range from 9.3 to less than 50.0 percent by weight.

The inventive fiber can be essentially (i.e., greater than 99 percent by weight, based on the total oxide content of the fiber) amorphous, essentially polycrystalline, or it can comprise both amorphous and polycrystalline regions.

Preferably, the fiber according to the present invention comprises polycrystalline regions of at least one crystalline phase selected from the group consisting of $Y_3Al_5O_{12}$, $YAlO_3$, and $Y_4Al_2O_9$. The fiber comprising crystalline $Y_3Al_5O_{12}$, $YAlO_3$, $Y_4Al_2O_O$, or a combination thereof may further comprise crystalline $Al_2O_3$, crystalline $Y_2O_3$, amorphous regions or combinations thereof.

Particularly useful embodiments of the inventive fiber comprise at least 50.0 percent by weight of polycrystalline $Y_3Al_5O_{12}$, $YAlO_3$, $Y_4Al_2O_9$, or a combination thereof. More preferred embodiments comprise at least 80.0 percent by weight of polycrystalline $Y_3Al_5O_{12}$, $YAlO_3$, $Y_4Al_2O_9$, or a combination thereof.

The present invention also provides a method of making a continuous ceramic oxide fiber, the method comprising the steps of
providing a stable, spinnable aqueous-based mixture comprising
(a) a solution comprising an alumina precursor salt dissolved in water, wherein the alumina precursor salt is represented by the formula, $Al(OH)_{3-x}(D)_x$, wherein X is in the range of about 0.5 to about 2.0 and D is a counterion selected from the group consisting of chloride, nitrate, carboxylate, and combinations thereof; and
(b) a colloidal yttria precursor dispersion;
(2) forming the aqueous-based continuous fiber; and
(3) heat-treating the green continuous fiber to a temperature and for a time sufficient to provide the continuous ceramic oxide fiber according to the present invention.

Particularly useful carboxylate counterions include, for example, formate, acetate, lactate, citrate, oxalate, and combinations thereof. The preferred alumina precursor is one of aluminum oxychloride, aluminum formoacetate, and a combination thereof. In this application:

"ceramic oxide" means metal oxide which is polycrystalline, amorphous, or a combination thereof;

"non-vitreous" means not formed from a melt;

"component" refers to an oxide compositional unit used to specify a chemical composition, independent of distinct phases or compounds which may be present;

"oxide content" (e.g., "$Y_2O_3$ content", "$Y_3Al_5O_{12}$ content", "$Al_2O_3$ content") refers to the amount of a component, expressed as a weight percent, based on the composition of the heat-treated ceramic fiber unless stated otherwise;

"total oxide content" (e.g., "total $Y_2O_3$ content") refers to the amount of a component inclusive of amounts accounted for by the specification of other components;

"additional oxide content" (e.g., "additional $Y_2O_3$ content") refers to the amount of a component exclusive of amounts accounted for by the specification of other components "yttria-alumina compound content" refers to the amount of a component that is compositionally equivalent to $Y_3Al_5O_{12}$, $YAlO_3$, $Y_4Al_2O_9$, or a combination thereof, wherein the composition of the component is chosen such that the amount is a maximum;

"mole ratio" refers to the ratio of moles of one component to moles of another component;

"amorphous" means a material having a diffuse X-ray diffraction pattern without definite lines to indicate the presence of a crystalline component;

"polycrystalline" means a material having a plurality of crystalline grains, wherein the average grain size is less than the diameter of the fiber;

"continuous fiber" means a fiber which has a length which is infinite for practical purpose as compared to its diameter;

"green" refers to ceramic articles which are not heat-treated or incompletely heat-treated;

"colloidal yttria precursor" means an insoluble yttria or yttrium hydroxide particle which may have anions or ligands in addition to oxygen or hydroxyl anions;

"spinnability" refers to a characteristic of the liquid precursor which allows continuous fibers to be drawn from it;

"stability" refers to the ability of a liquid precursor to resist precipitation, gelation, or viscosity change over a time period sufficient to allow fibers to be spun from it;

"transparent" means that the material, when viewed under an optical microscope, (e.g., with a stereoscopic microscope at 50 to 500× and under oblique or transmitted light), has the property of transmitting rays of visible light so that images of an article viewed through the material have sharp edges; and "translucent" means that the material, when similarly viewed, has the property of transmitting visible light to some degree so that images have unclear or blurred edges.

The fiber of the present invention is useful as thermal insulation, as a filter component, and as a reinforcement for structural composites.

DETAILED DESCRIPTION OF THE PREFERRED EMBODIMENTS

The present invention provides a non-vitreous, continuous, ceramic oxide fiber comprising Al, Y, and O, as described above, which typically is solid, flexible, refractory, smooth, transparent or translucent, and has high strength. Further, the inventive fiber generally has a circular or near circular cross-section.

The inventive fiber may further comprise at most 20 percent by weight of one or more metal oxide modifiers. Preferably, metal oxide modifier(s), if present in the fiber, comprise at most 10 percent by weight.

The oxide modifiers may be crystalline or amorphous, and may be present as separate phases, or in solid solution with phases containing $Al_2O_3$, $Y_2O_3$, or both.

Preferred metal oxide modifiers include, for example, zirconium oxide, hafnium oxide, silica, magnesium oxide, titanium oxide, cobalt oxide, zinc oxide, nickel oxide, iron oxide, chromium oxide lanthanum oxide, cerium oxide, neodymium oxide, samarium oxide, dysprosium oxide, rebium oxide, and ytterbium oxide. A preferred oxide modifier is silica for its ability to improve the tensile strength of crystalline fibers.

As noted above, the aqueous-based mixture from which the inventive fiber is derived comprises a colloidal yttria precursor and an alumina precursor salt.

Suitable aluminum salts can be prepared by techniques known in the art. For example, U.S. Pat. No. 4,798,814 (the disclosure of which is incorporated herein by reference) discloses a method for preparing an aluminum carboxylate, wherein aluminum metal is dissolved in a hot aqueous solution comprising formic acid and acetic acid.

U.S. Pat. No. 3,340,205 and British Pat. No. 1,139,258 (the disclosures of which are incorporated herein by reference), teach a method for preparing basic aluminum nitrate, wherein aluminum metal is digested in a nitric acid solution. Basic aluminum nitrates may also be prepared according to U.S. Pat. No. 2,127,504 (the disclosure of which is incorporated herein by reference), wherein aluminum nitrate is thermally decomposed.

Suitable colloidal yttria precursors are colloidal dispersions that contains less than 2 ligands or anions (e.g., acetate, nitrate, and chloride) per yttrium atom, other than oxygen or hydroxyl anions. The particle size of the colloidal yttria precursor is less than about 1 micrometer. Preferably, the particle size is in the range of about 0.005 to about 0.1 micrometer.

Colloidal yttria precursors are commercially available and include, for example, that available under the trade designation "COLLOIDAL YTTRIA SOL" (a modified yttria sol that contains about 1.25 moles of acetate ligands per mole of yttrium) from Nyacol Products of Ashland, MD.

The aqueous-based mixture may also contain a modifying additive or precursor thereof which can be added to enhance some desirable property of the fired fiber or to increase the effectiveness of the heat-treating step of the process (e.g., such additions may serve as nucleating agents, grain growth inhibitors, tougheners, sintering aids, or combinations thereof). These modifying additives are generally in the form of colloidal particles or soluble salts and typically consist of a metal-containing oxide or precursor thereof, wherein preferably the metal is selected from the group consisting of zirconium, hafnium, silicon, magnesium, titanium, iron, chromium, scandium, gadolinium, lanthanum, praseodymium, cerium, dysprosium, neodymium, samarium, ytterbium, and erbium. A preferred modifying additive is silica or a precursor thereof.

The oxide content of the modifying additive can be up to 20 percent by weight of the total oxide content of the fiber composition. Preferably, the oxide content of the modifying additive is up to about 10 percent by weight.

An aqueous-based mixture containing oxide precursors of the desired oxide composition, may not necessarily provide a stable, spinnable aqueous-based mixture. The spinnability of the aqueous-based mixture, however, may be improved by additives such as, for example, acids, water soluble organic polymers, or combinations thereof. Further, the stability of the aqueous-based mixture may be enhanced by additives such as, for example, acids.

Acids which may enhance the stability and improve the spinnability of the aqueous-based mixture include, for example, hydrochloric acid, nitric acid, acetic acid, formic acid, lactic acid, and combinations thereof. Such acids, for example, may improve and enhance the solubility of certain cations in the aqueous-based mixture, may prevent gelation of the aqueous-based mixture by modifying its pH, or may provide chelating ligands that improve the rheology of the aqueous-based mixture.

Lactic acid can be particularly useful in providing compatibility between the yttria and alumina precursors. Aqueous oxy or basic aluminum salts typically have a pH of well below 6. Colloidal yttria precursor such as, for example, that available from Nyacol Products under the trade designation "COLLOIDAL YTTRIA SOL", typically have a pH in the range from about 6.5 to about 7.0. An aqueous-based mixture comprised of such alumina and yttria precursors may gel, rendering the mixture unsuitable for fiber spinning. The addition of lactin acid to such an aqueous-based mixture can provide a stable (i.e., prevent gelation), spinnable aqueous-based mixture.

The amount and type of acid added to the aqueous-based mixture is selected so that the stability and spinnability of the aqueous-based mixture are not degraded. For example, large acid additions may cause simple stoichiometric salts of yttrium to precipitate when the aqueous-based mixture is concentrated to increase its viscosity (i.e., water is removed). Large acid additions also increase the amount of fugitive material that is removed during heat-treatment, increasing the likelihood of physical defects forming during the heat-treatment.

The amount of acid added to the aqueous-based mixture should not exceed 50 percent by weight of the total metal oxide content of the aqueous-based mixture. The amount of added acid is typically in the range from about 10 to about 30 percent by weight, based on the total oxide content of the aqueous-based mixture. Preferably, the acid content of the aqueous-based mixture is such that the total amount of anions and ligands contributed by oxide precursors and acid(s) (exclusive of oxygen and hydroxyl anions) is in the range from about 0.5 to about 2.0 equivalents per mole of trivalent cations.

Acid added to the aqueous-based precursor may interact with the oxide precursors and modify the chemical behavior of the precursors. Accordingly, the order in which the aqueous-based mixture components are combined may be significant. For example, in preparing an aqueous-based mixture comprising an alumina precursor, a colloidal yttria precursor, and lactic acid, it is preferable to add the lactic acid to the alumina precursor, and then add the colloidal yttria precursor to the alumina precursor and lactic acid.

Water soluble organic polymers, which can improve the spinnability of the aqueous-based mixture by modifying its rheology, may also improve the strength of the dried fibers. Preferably, the water soluble organic polymer is selected from the group consisting of polyvinyl pyrrolidone, polyvinyl alcohol, polyethylene oxide, corn syrup, and combinations thereof.

Typically, water soluble organic polymers may comprise up to 50 percent by weight of the metal oxide content of the aqueous-based mixture. Preferably, such organic polymers comprise in the range from about 5 to about 30 percent by weight of the total metal oxide content of the aqueous-based mixture.

To facilitate spinning of continuous fibers, it is preferable that the viscosity of the aqueous-based mixture be in the range of about 50,000 to about 200,000 g/sec-cm. The viscosity of the aqueous-based mixture can be increased using techniques known in the art including, for example, concentrating the aqueous-based mixture by partial evaporation of the liquid media (see e.g., U.S. Pat. No. 4,047,965 (Karst et. al.), the disclosure of which is incorporated herein by reference).

A preferred method of increasing the viscosity of (or concentrating) a dilute aqueous-based mixture is by partially evaporating the liquid media in an evacuated rotating flask.

The aqueous-based mixture can be formed (or spun) into green fibers using techniques known in the art, including, for example, by extruding it through a plurality of orifices using a multihole spinneret (see e.g., U.S. Pat. No. 4,047,965 (Karst et. al.). Preferably, the aqueous-based mixture is extruded in air under controlled temperature (e.g., about 20 to about 100° C.) and humidity (e.g., about 50 to about 70 percent relative humidity).

The formed green fiber is typically rigidified by partial dehydration during forming.

The rigidified green fiber is converted to a ceramic oxide by heat-treatment, wherein substantially all fugitive material (including the remaining liquid media) is removed.

The maximum heat-treatment temperature is generally in the range from about 400° to about 1500° C. Typically, the maximum heat-treatment temperature is in the range from about 600° to about 1300° C. More typically, the maximum heat-treatment temperature is in the range from about 750° to about 1150° C. Typical heat-treatment times range from a few minutes to several hours at elevated temperature. Factors to consider in selecting a heat-treatment temperature and time include, for example, the composition of the green fiber, the desired phase(s), the desired grain size of any crystalline phase(s), the desired density of the fiber, and the desired strength of the fiber. Amorphous fibers are obtained by heating the green fibers to a temperature below that at which crystallization occurs.

To avoid or inhibit formation of mechanical defects in the fiber during the removal of fugitive materials, the rate of such removal is typically minimized. The rate of such removal can be minimized, for example, by heating the green fiber at a rate of less than about 2° C. per minute up to a temperature at which substantially all fugitive material is removed. It may also be desirable to suppress combustion of carbon containing constituents by heating the green fibers in a covered container or in a non-oxidizing atmosphere such as, for example, nitrogen, argon, and combinations thereof. To remove any remaining carbon from the fibers, the fibers can be further heated in an oxygen containing atmosphere (e.g., air).

Preferably, the green fibers are heated in a non-oxidizing atmosphere to a temperature and for a time sufficient to allow removal of the fugitive materials (e.g., removal of at least 50 percent by weight of the fugitive material).

Preferably, the fiber according to the present invention has a diameter in the range from about 1 to about 50 micrometers. More preferably, the fiber diameter is in the range from about 5 to about 25 micrometers.

Polycrystalline fibers according to the present invention preferably have an average grain size of less than about 1000 nm. More preferably, such fibers have an average grain size of less than 500 nm, even more preferably, less than about 200 nm, and most preferably, less than about 100 nm.

The fiber according to the present invention is generally textile-like and is sufficiently strong such that it can be easily handled without apparent damage to the fiber. Preferably, the average tensile strength of the inventive fiber is at least about 0.35 GPa. More preferably, the average tensile strength of the fiber is at least 0.70 GPa, and most preferably, it is greater than about 1.4 GPa.

Fibers of the present invention are useful, for example, as thermal insulation, as a filter component, and as a reinforcement for structural composites. Fibers which are porous are useful as a catalyst support.

Fibers according to the present invention comprising an amorphous region can be used in an application wherein the amorphous region is subsequently partially or fully crystallized.

Theoretically, the inventive fibers may be useful as a reinforcement in metal matrix composites comprising such metals as, for example, titanium, aluminum, nickel, titanium aluminides, iron-based superalloys, and non-iron-based superalloys.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

The following solutions were used to prepare the examples. A description of how each of these solutions were made is given below:

SOLUTION I

An aluminum oxychloride solution was prepared as follows. About 392 grams of aluminum trichloride (i.e., $AlCl_3 \cdot 6H_2O$; commercially available from Alfa Chemicals of Danvers, MA) was dissolved in about 900 grams of deionized water to provide an aluminum trichloride solution. About 114 grams of aluminum foil (commercially available under the trade designation "REYNOLDS WRAP" from Reynolds Metal Co. of Richmond, VA) was digested into the aluminum trichloride solution under reflux conditions at about 100° C. to provide a clear solution containing about 0.8 moles of Cl ions per mole of Al ions. The aluminum foil was added to the solution in one gram pieces over a period of about 8 hours. The solution was then maintained under reflux conditions at about 95° to 100° C. for about 16 hours. The refluxed solution was cooled to room temperature, and then passed through a 0.3 micrometer filter (commercially available under the trade designation "BALSTON AAQ MICROFIBRE FILTER TUBES" from Balston Filter Products of Lexington, MA). The $Al_2O_3$ content of the filtered solution was about 22 percent.

SOLUTION II

An aluminum formoacetate solution was prepared by digesting about 54 grams of aluminum powder (commercially available under the trade designation "ALUMINUM METAL, FINEST POWDER" from Fisher Scientific Co. of Fair Lawn, NJ) in an aqueous solution comprising about 62.7 grams of formic acid, about 81.8 grams of acetic acid, and about 900 grams of deionized water. The aluminum powder was added to the acid solution. The resulting mixture was heated to about 100° C., and then refluxed at about 100° C. for about 14 hours to form a solution. The refluxed solution was cooled to room temperature and passed through two grades of filter paper (commercially available under the respective trade designations "WHATMAN #50 FILTER PAPER " AND "WHITMAN #54 FILTER PAPER" from Whatman Int., Ltd. of Maidstone, England) followed by filtration through a 0.45 micrometer filter (commercially available under the trade designation "MILLIPORE HAWP MEMBRANE FILTER" from Millipore Corp. of Bedford, PA). The $Al_2O_3$ content of the filtered solution was about 9 percent.

SOLUTION III

A 50 percent solution of medium molecular weight polyvinyl pyrrollidone (PVP) was prepared by dissolving PVP (commercially available under the trade designation "PVP K-30" from GAF Corp., of New York, NY) in deionized water.

A summary of the $Y_2O_3$ and $Al_2O_3$ mole ratios, and overall batched compositions of the examples is provided in Table 1, below.

TABLE 1

| Example | Samples | Batched $Y_2O_3:Al_2O_3$ mole ratio | Batched Composition weight percent | | |
|---|---|---|---|---|---|
| | | | $Y_2O_3$ | $Al_2O_3$ | $SiO_2$ |
| 1 | 1 to 12 | 1:1 | 68.9 | 31.1 | — |
| 2 | 13 to 20 | 1:1 | 68.9 | 31.1 | — |
| 3 | 21 to 29 | 3:5 | 57.1 | 42.9 | — |

TABLE 1-continued

| Example | Samples | Batched Y$_2$O$_3$:Al$_2$O$_3$ mole ratio | Batched Composition weight percent | | |
|---|---|---|---|---|---|
| | | | Y$_2$O$_3$ | Al$_2$O$_3$ | SiO$_2$ |
| 4 | 30 to 35 | 3:5 | 57.1 | 42.9 | — |
| 5 | 36 to 40 | 2:1 | 81.6 | 18.4 | — |
| 6 | 41 to 43 | 1:5.56 | 28.5 | 71.5 | — |
| 7 | 44 to 45 | 4.45:1 | 90.5 | 9.5 | — |
| 8 | 46 to 50 | 1:1 | 68.2 | 30.8 | 1.0 |
| 8 | 51 to 53 | 1:1 | 65.6 | 29.6 | 4.8 |
| 8 | 54 to 58 | 1:1 | 62.6 | 28.3 | 9.1 |
| 9 | 59 to 65 | 3:5 | 51.9 | 39.0 | 9.1 |
| 10 | 66 to 67 | 2:1 | 74.1 | 16.7 | 9.1 |
| 11 | 68 to 69 | 4.1:1 | 83.7 | 9.3 | 7 |

EXAMPLES 1 AND 2

The fibers prepared in Examples 1 and 2 had an Y$_2$O$_3$ to Al$_2$O$_3$ mole ratio of about 1:1.

EXAMPLE 1

An aqueous-based mixture was prepared as follows. About 18 grams of an aluminum oxychloride solution (Solution I) was combined with about 42.8 grams of an aluminum formoacetate solution (Solution II). In the following order, about 3.5 grams of lactic acid, about 3.1 grams of nitric acid, about 122 grams of an yttria sol (14 percent yttria; commercially available under the trade designation "COLLOIDAL Y$_2$O$_3$" from Nyacol Products of Ashland, MD), and about 15 grams of a PVP solution (Solution III) were added to the aluminum oxychloride-aluminum formoacetate solution, while stirring.

The aqueous-based mixture was concentrated in a rotary evaporator (commercially available under the trade designation "BUCHI ROTARY EVAPORATOR" from Buchi Instruments of Westbury, NY), wherein the temperature of the water bath was about 35° to 40° C. Evacuation of the chamber containing the aqueous-based mixture was provided by a water-aspirated vacuum. The aqueous-based mixture was evaporated until a fiberizable viscosity was obtained. The fiberizable viscosity was determined by visual inspection. It is estimated that the viscosity was about 100,000 g/sec-cm.

A portion of the aqueous-based mixture was transferred to a 40-hole spinneret having 50 micrometer diameter holes. Fibers were extruded through the spinneret holes under a pressure of about 2.1 MPa and drawn downward through a 1.8 meter open chamber onto a 1.8 meter circumference wheel at a rate of about 55.9 meters per second. The air temperature of the open chamber, which had a relative humidity of about 45 to 55 percent, was about 29° to 35° C.

The continuous fibers were removed from the wheel, cut into 7.5 to 15.5 centimeter long bundles, and stored in a drier at about 80° C.

For each sample, a bundle of fibers was placed in a 7.6 cm diameter tube furnace at room temperature, heated to temperature at a rate of about 2° C. per minute, held at temperature for about 35 minutes, after which time the power to the furnace was turned off. The bundle was allowed to cool to room temperature in the furnace. The furnace atmosphere during the heating and cooling was flowing nitrogen. The rate of nitrogen flow through the tube furnace was about 2 liters per minute. The heat-treatment temperature of each sample is listed in Table 2, below.

TABLE 2

| Sample | Heat-treatment temperature. °C. | | Average fiber diameter, micrometers | Average tensile strength. GPa (ksi) | Phase(s) present (major phase/ minor phase/trace) |
|---|---|---|---|---|---|
| | Nitrogen heat-treatment atmosphere | Air heat-treatment atmosphere | | | |
| 1 | 500 | 500 | 6.8 | 0.95 (138) | amorphous (major phase) |
| 2 | 500 | 600 | 6.8 | 0.90 (130) | amorphous (major phase) |
| 3 | 500 | 700 | 6.7 | 0.97 (141) | amorphous (major phase) |
| 4 | 500 | 800 | 6.7 | 0.30 (43) | amorphous (major phase) |
| 5 | 500 | 900 | 6.1 | 0.30 (44) | Y$_3$Al$_5$O$_{12}$* (major phase) Y$_4$Al$_2$O$_9$* (minor phase) |
| 6 | 600 | 600 | 6.7 | 1.10 (159) | ** |
| 7 | 700 | 700 | 6.6 | 1.38 (200) | ** |
| 8 | 700 | 800 | 6.5 | 0.97 (140) | ** |
| 9 | 700 | 900 | 6.0 | 0.29 (42) | ** |
| 10 | 800 | 800 | 6.2 | 1.53 (222) | amorphous (major phase), Y$_3$Al$_5$O$_{12}$* (trace phase) |
| 11 | 800 | 1000 | ** | ** | Y$_3$Al$_5$O$_{12}$* (major phase), YAlO$_9$* |
| 12 | 900 | 900 | 6.5 | 0.40 (58) | YAlO$_3$* (major phase) amorphous (trace) |

*crystalline phase
**not measured

The bundle was then heat-treated in a box furnace having a static air atmosphere. The bundle was placed in the furnace at room temperature, heated to temperature at a rate of about 2° C. per minute, held at temperature for about 35 minutes, after which time the power to the furnace was turned off. The bundle was allowed to cool in the furnace to room temperature. The heat-treatment temperature of each sample is listed in Table 2, above.

Samples 3, 4, 10, and 12 were examined using an optical microscope and observed to be transparent. Sample 5 was also examined using an optical microscope and observed to be translucent.

All heat-treated fibers were flexible and easily handled with minimal apparent damage to the bundle.

The tensile strengths of 10 fibers from all but one sample were determined using a tensile strength tester, commercially available under the trade designation "APPLIED TEST SYSTEMS SERIES 1101" from Applied Test Systems, Inc. of Butler, PA. Each individual fiber was gripped in a spring-loaded clamp having 6 mm square rubber faces. The top clamp was hung from a hook on the cross-head of the testing machine to produce a purely tensile load on the fiber. Fibers were tested to failure at a rate of about 0.05 cm per minute. The gauge length was about 6 mm. Fiber diameters were measured using an optical microscope by viewing the cross-section of one of the broken ends of the fiber.

The high and low tensile strength values of each fiber for a given sample were discarded and the remaining 8 tensile strength values averaged to provide the tensile strength values reported in Table 2, above.

X-ray diffraction was used to determine the phases present in several samples. The phases detected are reported in Table 2, above. The relative amount of each phase detected is designated by the terms "major phase", "minor phase", and "trace". The term "major phase" as used herein refers to a phase whose integrated main peak intensity (as determined by X-ray diffraction) is equal to or greater than about 50 percent of that corresponding to the phase with the largest main peak. The term "minor phase" as used herein refers to a phase whose integrated main peak intensity is less than about 50 percent but greater than about 5 percent of that corresponding to that of the largest main peak. The term "trace" as used herein refers to a phase whose integrated main peak intensity is less about 5 percent of that of largest main peak.

Samples 3, 5, and 11 were examined using a scanning electron microscope and observed to have a circular cross-section and a smooth outer surface. Further Sample 3 had a glassy or amorphous appearance, whereas Samples 5 and 11 were observed to have grains an average size of about 1000 nm.

meters per minute, and the heat-treatment conditions for each sample were as listed in Table 3, below.

TABLE 3

| Sample | Heat-treatment temperature, °C. | | Average fiber diameter, micrometers | Average tensile strength, GPa (ksi) | Phase(s) present (major phase/ minor phase/trace) |
|---|---|---|---|---|---|
| | Nitrogen heat-treatment atmosphere | Air heat-treatment atmosphere | | | |
| 13 | 500 | 500 | 11.2 | 0.43 (62) | ** |
| 14 | 500 | 600 | 9.9 | 0.64 (93) | ** |
| 15 | 700 | 700 | 8.8 | 0.70 (101) | ** |
| 16 | 600 | 600 | 10.8 | 0.56 (81) | ** |
| 17 | 700 | 700 | 11.6 | 0.62 (90) | ** |
| 18 | 800 | 800 | 10.3 | 0.66 (96) | ** |
| 19 | — | 800 | 12 | ** | amorphous (major phase), $Y_3Al_5O_{12}$* (trace) |
| 20 | — | 1000 | 12 | ** | $Y_3Al_5O_{12}$* (major phase) $Y_4Al_2O_9$* (major phase) |

*crystalline phase
**not measured

Samples 13 to 18 were flexible and easily handled with minimal apparent damage to the bundle. Samples 19 and 20, which were heat-treated only in an air atmosphere, were significantly weaker than the samples which were heat-treated in both nitrogen and air atmospheres.

The phases present in several samples, as determined by x-ray diffraction, are reported in Table 3, above. The average tensile strength values of several samples are also reported in Table 3.

EXAMPLE 3 AND 4

The fibers prepared in Examples 3 and 4 had an $Y_2O_3$ to $Al_2O_3$ mole ratio of about 3:5.

Example 3

Samples numbered 21 to 29 were prepared as described in Example 1, except the aqueous-based mixture contained about 29.2 grams of the aluminum oxychloride solution (Solution I), about 71.4 grams of the aluminum formoacetate solution (Solution II), about 5 grams of lactic acid, about 4.4 grams of nitric acid, about 122 grams of the yttria sol, and about 18 grams of the PVP solution (Solution III). Further, the heat-treatment temperatures for each sample are listed in Table 4, below.

TABLE 4

| Sample | Heat-treatment temperature, °C. | | Average fiber diameter, micrometers | Average tensile strength, GPa (ksi) | Phase(s) present (major phase/ minor phase/trace) |
|---|---|---|---|---|---|
| | Nitrogen heat-treatment atmosphere | Air heat-treatment atmosphere | | | |
| 21 | 500 | 500 | 7.3 | 0.65 (94) | amorphous (major phase) |
| 22 | 500 | 500 | 7.4 | 0.78 (113) | amorphous (major phase) |
| 23 | 500 | 700 | 7.2 | 1.10 (159) | amorphous (major phase) |
| 24 | 500 | 800 | ** | ** | amorphous (major phase) |
| 25 | 500 | 900 | * | ** | $Y_3Al_5O_{12}$* (major phase) |
| 26 | 600 | 500 | 7.1 | 0.83 (121) | ** |
| 27 | 600 | 600 | 7.5 | 0.95 (138) | ** |
| 28 | 800 | 800 | ** | ** | amorphous (major phase), $Y_3Al_5O_{12}$* (trace) |
| 29 | — | 800 | ** | ** | ** |
| 29A | — | 1000 | ** | ** | ** |

*crystalline phase
**not measured

Example 2

Samples numbered 13 to 20 were prepared and tested as described in Example except the spinneret had 75 micrometer diameter holes, the aqueous-based mixture was extruded at a pressure of about 1.4 MPa, and the fibers were drawn and wound at a rate of about 36.6

Samples 21 to 28 were flexible and easily handled with minimal apparent damage to the bundle. Samples 29 and 29A, which were heat-treated only in an air atmosphere, were significantly weaker than the samples which were heat-treated in both nitrogen and air atmospheres.

Samples 23 and 28 were examined using an optical microscope and observed to be transparent and slightly translucent (mottled), respectively.

Samples 23, 24, and 29A were examined using a scanning electron microscope and observed to have a circular cross-section and a smooth outer surface. Further, Samples 24 and 29A were each observed to have grains having an average size of about 100 nm, whereas Sample 23 had a glassy or amorphous appearance.

The average tensile strengths were determined as described in Example 1 and are reported in Table 4, above. The phases present in several samples, as determined by x-ray diffraction, are also reported in Table 4.

EXAMPLE 4

Samples numbered 30 to 35 were prepared and tested as described in Example 3, except the spinneret had 75 micrometer diameter holes, the aqueous-based mixture was extruded at about 1.4 MPa. and the fibers were drawn and wound at about 36.6 meters per minute and the heat-treatment conditions for each sample were as reported in Table 5, below.

TABLE 5

| Sample | Heat-treatment temperature. °C. Nitrogen heat-treatment atmosphere | Heat-treatment temperature. °C. Air heat-treatment atmosphere | Average fiber diameter, micrometers | Average tensile strength. GPa (ksi) | Phase(s) present (major phase/ minor phase/trace) |
|---|---|---|---|---|---|
| 30 | 500 | 500 | 10.3 | 0.64 (93) | ** |
| 31 | 500 | 500 | 11.0 | 0.68 (98) | ** |
| 32 | 500 | 700 | 10.5 | 0.88 (127) | ** |
| 33 | 600 | 600 | 10.7 | 0.68 (98) | ** |
| 34 | 900 | 900 | ** | ** | ** |
| 35 | — | 800 | ** | ** | ** |

*crystalline phase
**not measured

Samples 30 to 34 were flexible and easily handled with minimal apparent damage to the bundle. Sample 35, which was heat-treated only in an air atmosphere, was significantly weaker than the samples, which were heat-treated in both nitrogen and air atmospheres.

The average tensile strength values for each sampled tested are also reported in Table 5, above.

EXAMPLE 5

Samples numbered 36 to 40, had an $Y_2O_3$ ato $Al_2O_3$ mole ratio of about 2:1

An aqueous-based mixture was prepared as described in Example except the amount of aluminum oxychloride solution (Solution I) was about 17.6 grams, the amount of lactic acid was about 7 grams, and no aluminum formoacetate solution (Solution II) or nitric acid were used.

The heat-treatment conditions were as shown in Table 6, below.

TABLE 6

| Sample | Heat-treatment temperature. °C. Nitrogen heat-treatment atmosphere | Heat-treatment temperature. °C. Air heat-treatment atmosphere | Average fiber diameter, micrometers | Average tensile strength, GPa (ksi) | Phase(s) present (major phase/ minor phase/trace) |
|---|---|---|---|---|---|
| 36 | 700 | 700 | ** | ** | amorphous (major phase) |
| 37 | 900 | 900 | ** | ** | $Al_2Y_4O_9$* (major phase) |
| 38 | — | 700 | ** | ** | amorphous (major phase) |
| 39 | — | 900 | ** | ** | $Al_2Y_4O_9$* (major phase) |
| 40 | — | 1000 | ** | ** | $Al_2Y_4O_9$* (major phase) |

*crystalline phase
**not measured

The heat-treated fibers, which were colorless and transparent to translucent in appearance, were flexible, but were not as strong as the fibers of Examples 1 to 4. Samples to 38, which were heat-treated only in an air atmosphere, were significantly weaker than Samples 36 and 37 which had been heat-treated in both nitrogen and air atmospheres.

The phase(s) present in each sample, as determined by x-ray diffraction, are reported in Table 6, above.

EXAMPLE 6

Samples numbered 41 to 43 had an $Y_2O_3$ to $Al_2O_3$ mole ratio of about 1:5.56 The samples were prepared as described in Example 1, except the aqueous-based mixture contained about grams of an aluminum oxychloride solution (Solution I), about 240 grams of an aluminum formoacetate solution (Solution II), about 15 grams of lactic acid, about 4.4 grams of nitric acid, and about 18 grams of a PVP solution (Solution III).

The heat-treatment conditions and average tensile strength values for each sample are listed in Table 7, below.

TABLE 7

| Sample | Heat-treatment temperature. °C. Nitrogen heat-treatment atmosphere | Heat-treatment temperature. °C. Air heat-treatment atmosphere | Average fiber diameter, micrometers | Average tensile strength, GPa (ksi) | Phase(s) present (major phase/ minor phase/trace) |
|---|---|---|---|---|---|
| 41 | 500 | 800 | 7.7 | 1.97 (285) | amorphous (major phase) |
| 42 | 500 | 900 | 7.8 | 2.26 (328) | amorphous (major phase) $\eta Al_2O_3$* (minor phase-trace) |
| 43 | 500 | 1000 | 8.0 | 0.99 (144) | $YAlO_3$* (major phase) |

TABLE 7-continued

| Sample | Heat-treatment temperature, °C. Nitrogen heat-treatment atmosphere | Air heat-treatment atmosphere | Average fiber diameter, micrometers | Average tensile strength, GPa (ksi) | Phase(s) present (major phase/ minor phase/trace) |
|---|---|---|---|---|---|
| | | | | | $Y_3Al_5O_{12}$* (major phase) $\eta Al_2O_3$* (trace) |

*crystalline phase

The heat-treated fibers were flexible and easily handled with minimal apparent damage to the bundle.

The phase(s) present in each sample, as determined by x-ray diffraction, are reported in Table 7, above.

Example 7

Samples 44 and 45 had an $Y_2O_3$ to $Al_2O_3$ mole ratio of about 4.45:1. The samples were prepared and tested as described in Example 6 except the aqueous-based mixture contained about 18 grams of an aluminum oxychloride solution (solution I), about 272 grams of an yttria sol (COLLOIDAL $Y_2O_3$ SOL), about 10.5 grams of lactic acid, about 30 grams of a PVP solution (Solution III), no aluminum formoacetate solution (Solution II), and no nitric acid.

The heat-treatment conditions and average tensile strength values for each sample are listed in Table 8, below.

EXAMPLES 8 TO 11

The fibers prepared in Examples 8 to 11 illustrate the improvement in the tensile strength of crystalline fibers as well as fibers fired only in an air atmosphere, with the addition of $SiO_2$.

Example 8

Samples 46 to 58 had an $Y_2O_3$ to $Al_2O_3$ mole ratio of about 1:1. Samples 46 to 50 were prepared and tested as described in Example 1, except about 0.6 grams of a silica sol (40 percent $SiO_4$ content, commercially available under the trade designation "NALCO 2327" from Nalco Chemical Co. of Oak Brook, IL) and about 17.6 grams of the aluminum oxychloride solution were added in the aqueous-based mixture. For samples 51 to 53, about 3.1 grams of the silica sol were added with the 17.6 grams of the aluminum oxychloride solution to the

TABLE 8

| Sample | Heat-treatment temperature, °C. Nitrogen heat-treatment atmosphere | Air heat-treatment atmosphere | Average fiber diameter, micrometers | Average tensile strength, GPa (ksi) | Phase(s) present (major phase/ minor phase/trace) |
|---|---|---|---|---|---|
| 44 | 500 | 800 | 11.6 | 0.54 (79) | amorphous (major phase), $Y_2O_3$* (trace) |
| 45 | 500 | 900 | 9.5 | 0.81 (118) | $Y_2O_3$* (major phase), $Al_2Y_4O_9$* (major phase) |

The heat-treated fibers were flexible and easily handled with minimal apparent damage to the bundle.

The phase(s) present in each sample, as determined by x-ray diffraction, are reported in table 8, above.

aqueous-based mixture. For samples 54 to 58, about 6.2 grams of the silica sol were added with the 17.6 grams of the aluminum oxychloride solution to the aqueous-based mixture. Further, the heat-treatment conditions for each sample are reported in Table 9, below.

TABLE 9

| Sample | Percent $SiO_2$ | Heat-treatment temperature, °C. Nitrogen heat-treatment atmosphere | Air heat-treatment atmosphere | Average fiber diameter, micrometers | Average tensile strength, GPa (ksi) | Phase(s) present (major phase/ minor phase/trace) |
|---|---|---|---|---|---|---|
| 46 | 1.0 | 500 | 700 | 6.1 | 0.82 (119) | ** |
| 47 | 1.0 | 800 | 800 | 6.0 | 0.79 (114) | ** |
| 48 | 1.0 | 800 | 900 | 5.9 | 0.41 (59) | ** |
| 49 | 1.0 | 800 | 1000 | 5.5 | 0.34 (49) | $Y_3Al_5O_{12}$* (major phase), $Y_4Al_2O_9$* (minor phase), $YAlO_3$* (minor phase) |
| 50 | 1.0 | — | 800 | 9.2 | 0.49 (71) | amorphous (major phase), $Y_3Al_5O_{12}$* (minor phase-trace) |
| 51 | 4.8 | 800 | 800 | 8.1 | 0.82 (119) | ** |
| 52 | 4.8 | 800 | 900 | 6.7 | 0.80 (116) | ** |
| 53 | 4.8 | 800 | 1000 | 6.9 | 0.85 (123) | $Y_3Al_5O_{12}$* (major phase), $Y_4Al_2O_9$* (minor phase), $YAlO_3$* (minor phase) |
| 54 | 9.1 | 500 | 700 | 10.5 | 0.81 (118) | ** |
| 55 | 9.1 | 500 | 1000 | ** | ** | ** |
| 56 | 9.1 | 800 | 800 | 10.5 | 0.57 (83) | ** |
| 57 | 9.1 | 800 | 900 | 10.5 | 0.88 (128) | ** |
| 58 | 9.1 | 800 | 1000 | 10.8 | 0.85 (123) | $Y_3Al_5O_{12}$* (major phase), $Y_2O_3$* (minor phase), $YAlO_3$* (minor phase) |

*crystalline phase
**not measured

All heat-treated samples were flexible and easily handled with minimal apparent damage to the bundle.

The phase(s) present in several samples, as determined by x-ray diffraction, are reported in Table 9, above. The average tensile strengths for the samples tested are also in Table 9.

Samples 49 and 53 were examined using an optical microscope and were observed to be transparent and translucent, respectively. Sample 58 was examined using a scanning electron microscope and observed to have a circular cross-section and a smooth outer surface. Further Sample 58 was observed to have grains having an average size of about 100 nm.

Example 9

Samples 59 to 65, which had an $Y_2O_3$ to $Al_2O_3$ mole ratio of about 3:5, were prepared and tested as described in Example 3, except about 7.5 grams of a silica sol (NALCO 2327), about 10 grams of lactic acid, and no nitric acid were added to the aqueous-based mixture. The heat-treatment conditions and average tensile strength values for each sample tested are reported in Table 10, below.

TABLE 10

| Sample | Percent $SiO_2$ | Heat-treatment temperature, °C. Nitrogen heat-treatment atmosphere | Heat-treatment temperature, °C. Air heat-treatment atmosphere | Average fiber diameter, micrometers | Average tensile strength, GPa (ksi) | Phase(s) present (major phase/ minor phase/trace) |
|---|---|---|---|---|---|---|
| 59 | 9.1 | 500 | 700 | 7.3 | 0.85 (123) | ** |
| 60 | 9.1 | 500 | 800 | 6.3 | 1.21 (175) | ** |
| 61 | 9.1 | 500 | 900 | 5.9 | 1.23 (178) | ** |
| 62 | 9.1 | 800 | 800 | 7.1 | 0.75 (109) | amorphous (major phase), $Y_3Al_5O_{12}$* (minor phase-trace) |
| 63 | 9.1 | 800 | 900 | 6.7 | 0.70 (102) | ** |
| 64 | 9.1 | 800 | 1000 | — | ** | $Y_3Al_5O_{12}$* (major phase), $YAlO_3$* (major phase), $Y_4Al_2O_9$* (minor phase) |
| 65 | 9.1 | — | 800 | 6.5 | 0.78 (113) | ** |

*crystalline phase
**not measured

All heat-treated samples were flexible and easily handled with minimal apparent damage to the bundle.

The phases present in several samples, as determined by x-ray diffraction, are reported in Table 10, above.

Example 10

Samples numbered 66 and 67 has an $Y_2O_3$ to $Al_2O_3$ mole ratio of about 2:1. The samples were prepared and tested as described in Example 5, except about 5.2 grams of a silica sol (NALCO 2327) and no PVP (Solution III) were added to the aqueous-based mixture.

The heat-treatment conditions and average tensile strength values for each sample are listed in Table 11, below.

TABLE 11

| Sample | Percent $SiO_2$ | Heat-treatment temperature, °C. Nitrogen heat-treatment atmosphere | Heat-treatment temperature, °C. Air heat-treatment atmosphere | Average fiber diameter, micrometers | Average tensile strength, GPa (ksi) | Phase(s) present (major phase/ minor phase/trace) |
|---|---|---|---|---|---|---|
| 66 | 9.1 | 500 | 800 | 5.2 | 0.66 (95) | amorphous (major phase) |
| 67 | 9.1 | 500 | 900 | 5.2 | 0.54 (79) | $Y_4Al_2O_9$* (major phase) |

*crystalline phase

The heat-treated fibers were flexible and easily handled with minimal apparent damage to the bundle.

The phase(s) present in each sample, as determined by x-ray diffraction, are reported in Table 11, above.

Samples 66 and 67 were examined using an optical microscope and observed to be transparent.

Example 11

Samples numbered 66 and 67 had an $Y_2O_3$ to $Al_2O_3$ mole ratio of about 4.1:1. The samples were prepared and tested as described in Example 1, except the aqueous-based mixture contained about 18 grams of an aluminum oxychloride solution (Solution I), about 256 grams of a $Y_2O_3$ sol (COLLOIDAL $Y_2O_3$), about 10.5 grams of lactic acid, about 30 grams of a PVP solution (Solution III), about 7.5 grams of silica sol (NALCO 2327), no aluminum formoacetate solution (Solution II), and no nitric acid.

The heat-treatment conditions and average tensile strength values for each sample are listed in Table 12, below.

TABLE 12

| Sample | Percent $SiO_2$ | Heat-treatment temperature, °C. Nitrogen heat-treatment atmosphere | Heat-treatment temperature, °C. Air heat-treatment atmosphere | Average fiber diameter, micrometers | Average tensile strength, GPa (ksi) | Phase(s) present (major phase/ minor phase/trace) |
|---|---|---|---|---|---|---|
| 68 | 7 | 500 | 900 | 10.5 | 1.25 (181) | ** |
| 69 | 7 | 500 | 1000 | 10.0 | 0.84 (122) | ** |

**not measured

The heat-treated fibers were flexible and easily handled with minimal apparent damage to the buddle.

Various modifications and alternations of this invention will become apparent to those skilled in the art without departing from the scope and spirit of this invention, and it should be understood that this invention is not to be unduly limited to the illustrative embodiments set forth herein.

We claim:

1. A continuous ceramic oxide fiber comprising Al, Y, and O, wherein said fiber comprises at least one of an amorphous region or a polycrystalline region, wherein said fiber has a total $Y_2O_3$ content in the range from 28.5 to 90.7 percent by weight and a total $Al_2O_3$ content in the range from 71.5 to 9.3 percent by weight, and wherein the sum of said total $Y_2O_3$ content and said total $Al_2O_3$ content is at least 80.0 percent by weight, based on the total oxide content of the fiber, said fiber having an average tensile strength of at least 0.35 GPa.

2. The fiber according to claim 1 wherein said total $Y_2O_3$ content is the range from 45.7 to 85.3 percent by weight and said total $Al_2O_3$ content is in the range from 54.3 to 14.7 percent by weight.

3. The fiber according to claim 1 wherein said total $Y_2O_3$ content is the range from greater than 50.0 to 90.7 percent by weight and said total $Al_2O_3$ content is in the range from less than 50.0 to 9.3 percent by weight.

4. The fiber according to claim 1 wherein said fiber comprises amorphous regions and polycrystalline regions.

5. The fiber according to claim 1 wherein said polycrystalline region comprises at least one crystalline phase selected from the group consisting of crystalline $Y_3Al_5O_{12}$, crystalline $YAlO_3$, and crystalline $Y_4Al_2O_9$.

6. The fiber according to claim 5 wherein said fiber further comprises at least one of crystalline $Al_2O_3$, or crystalline $Y_2O_3$ regions.

7. The fiber according to claim 1 wherein said fiber comprises at least 50.0 percent by weight of an yttria-alumina compound selected from the group consisting of polycrystalline $Y_3Al_5O_{12}$, polycrystalline $YAlO_3$, polycrystalline $Y_4Al_2O_9$, and combinations thereof.

8. The fiber according to claim 1 wherein said fiber comprises at least 50.0 percent by weight of an yttria-alumina compound selected from the group consisting of polycrystalline $Y_3Al_5O_{12}$, polycrystalline $YAlO_3$, and polycrystalline $Y_4Al_2O_9$.

9. The fiber according to claim 1 wherein said fiber further comprises up to 20 percent by weight of a metal oxide selected from the group consisting of zirconium oxide, hafnium oxide, silica, magnesium oxide, titanium oxide, cobalt oxide, zinc oxide, nickel oxide, iron oxide, chromium oxide, lanthanum oxide, cerium oxide, neodymium oxide, samarium oxide, hysprosium oxide, erbium oxide, ytterbium moxide, and combinations thereof.

10. The fiber according to claim 1 further comprising up to 20 percent by weight of silica.

11. The fiber according to claim 1 having a diameter in the range from about 1.0 to about 50.0 micrometers.

12. The fiber according to claim 1 which is transparent.

13. The fiber according to claim 1 comprising said polycrystalline region and having crystalline grains having an average grin size of less than about 1000 nm.

14. The fiber according to claim 1 wherein said fiber is derived from a colloidal yttria precursor dispersion.

15. The fiber according to claim 1 wherein said fiber is derived from a water soluble alumina precursor salt represented by the formula, $Al(OH)_{3-x}(D)_x$, wherein X is in the range of about 0.5 to about 2.0 and D is a counterion selected from the group consisting of chloride, nitrate, carboxylate, and combinations thereof.

16. The fiber according to claim 1 wherein said fiber is derived from a colloidal yttria precursor dispersion and a water soluble alumina precursor salt represented by the formula, $Al(OH)_{3-x}(D)_x$, wherein X is in the range of about 0.5 to about 2.0 and D is a counterion selected from the group consisting of chloride, nitrate, carboxylate, and combinations thereof.

17. The fiber according to claim 1 wherein said total $Y_2O_3$ content is in the range from 57.1 to 81.6 percent by weight and said total $Al_2O_3$ content is in the range from 42.9 to 18.4 percent by weight.

18. The fiber according to claim 1 wherein said fiber further comprises at least one of crystalline $Al_2O_3$ or crystalline $Y_2O_3$ regions.

19. The fiber according to claim 1 wherein said fiber is essentially amorphous.

20. The fiber according to claim 1 wherein said fiber is essentially polycrystalline.

21. The fiber according to claim 9 wherein said polycrystalline region comprises at least one crystalline phase selected from the group consisting of crystalline $Y_3Al_5O_{12}$, crystalline $YAlO_3$, and crystalline $Y_4Al_2O_9$.

22. The fiber according to claim 1 wherein said fiber comprises at least 80.0 percent by weight of an yttria-alumina compound(s) selected form the group consisting of polycrystalline $Y_3Al_5O_{12}$, polycrystalline $YAlO_3$, and polycrystalline $Y_4Al_2O_9$, and combinations thereof.

23. The fiber according to claim 1 wherein said fiber comprises at least 80.0 percent by weight of an yttria-alumina compound selected form the group consisting of polycrystalline $Y_3Al_5O_{12}$, polycrystalline $YAlO_3$, and polycrystalline $Y_4Al_2O_9$.

24. The fiber according to claim 9 wherein said fiber comprises up to 10 percent by weight of said metal oxide and the sum of said $Y_2O_3$ and said $Al_2O_3$ content is at least 90 percent by weight.

25. The fiber according to claim 1 having an average tensile strength of at least 0.70 GPa.

26. The fiber according to claim 1 having an average tensile strength of at least 1.4 GPa.

27. The fiber according to claim 1 comprising said polycrystalline region and having crystalline grains having an average grain size of less than about 500 nm.

28. The fiber according to claim 1 comprising said polycrystalline region and having crystalline grains having an average grain size of less than about 200 nm.

29. The fiber according to claim 1 comprising said polycrystalline region and having crystalline grains having an average of less than about 100 nm.

30. A continuous ceramic oxide fiber comprising Al, Y, and O, wherein said fiber comprises at least one of amorphous region or polycrystalline regions, wherein said fiber has a total $Y_2O_3$ content in the range from 28.5 to 90.7 percent by weight and a total $Al_2O_3$ content in the range from 71.5 to 9.3 percent by weight, and wherein the sum of said total $Y_2O_3$ content and said total $Al_2O_3$ content is at least 80.0 percent by weight, based on the total oxide content of the fiber, said fiber being derived from a colloidal yttria precursor dispersion and a water soluble alumina precursor salt represented by the formula, $Al(OH)_{3-x}(D)_x$, wherein X is in the range from about 0.5 to about 2. and D is a counterion selected from the group consisting of chloride, nitrate, carboxylate, and combinations thereof.

* * * * *

UNITED STATES PATENT AND TRADEMARK OFFICE
CERTIFICATE OF CORRECTION

PATENT NO. : 5,217,933

DATED : June 8, 1993

INVENTOR(S) : Kenton D. Budd and David M. Wilson

It is certified that error appears in the above-identified patent and that said Letters Patent is hereby corrected as shown below:

Column 1, line 22, "yttria" should read --(yttria--.

Column 1, line 24, "Burru, Jr. et. al.)" should read --Burrus Jr. et al.--.

Column 1, line 29, "Morton et. al." should read --Morton et al.--.

Column 1, line 30, "(Morton et. al.) 3,950,478 (Kensworth et. al.)" should read --(Morton et al.), 3,950,478 (Kensworth et al.)--.

Column 1, line 31, "(Sowan et. al.) should read --Sowman et al.)--.

Column 1, line 43, "(Church et. al.)" should read --(Church et al.)--.

Column 1, line 58, "(Monroe et. al.)" should read --(Monroe et al.)--.

Column 1, lines 64-65, "(Morris et. al.)" should read --(Morris et al.)--.

UNITED STATES PATENT AND TRADEMARK OFFICE
CERTIFICATE OF CORRECTION

PATENT NO. : 5,217,933

DATED : June 8, 1993

INVENTOR(S) : Kenton D. Budd and David M. Wilson

It is certified that error appears in the above-identified patent and that said Letters Patent is hereby corrected as shown below:

Column 2, line 19, "L" should read --a fiber--.

Column 2, line 35, after "by" add --weight.--.

Column 2, line 59, "$Y_4Al_2O_o$" should read --$Y_4Al_2O_9$--.

Column 3, line 17, "aqueous-based continuous" should read --aqueous-based mixture into a green continuous--.

Column 3, line 44, "refers ,to" should read --refers to--.

Column 3, line 46, after "components" add --;--.

Column 4, line 42, "rebium" should read --erbium--.

Column 5, line 58, "lactin" should read --lactic--.

Column 11, line 65, "Example" should read --Example 1,--.

Column 14, line 2, "Example" should read --Example 1--.

Column 14, line 33, "1:5.56" should read --1:5.56.--.

Column 14, line 49, "about grams" should read --about 97 grams--.

UNITED STATES PATENT AND TRADEMARK OFFICE
CERTIFICATE OF CORRECTION

PATENT NO. : 5,217,933
DATED : June 8, 1993
INVENTOR(S) : Kenton D. Budd and David M. Wilson It is certified that error appears in the above-identified patent and that said Letters Patent is hereby corrected as shown below:

Column 18, line 65, "alternations" should read --alterations--.

Column 19, line 32, "$Y_{21\,O3}$" should read --$Y_2O_3$--.

Column 19, line 49, "hysprosium" should read --dysprosium--.

Column 19, line 50, "moxide" should read --oxide--.

Column 19, line 61, "grin" should read --grain--.

Column 20, line 64, "2." should read --2.0--.

Signed and Sealed this

Twenty-second Day of March, 1994

Attest:

BRUCE LEHMAN

Attesting Officer   Commissioner of Patents and Trademarks